E. A. JOHNSTON.
STARTING MECHANISM FOR EXPLOSIVE ENGINES.
APPLICATION FILED JUNE 6, 1908.
906,030.
Patented Dec. 8, 1908.
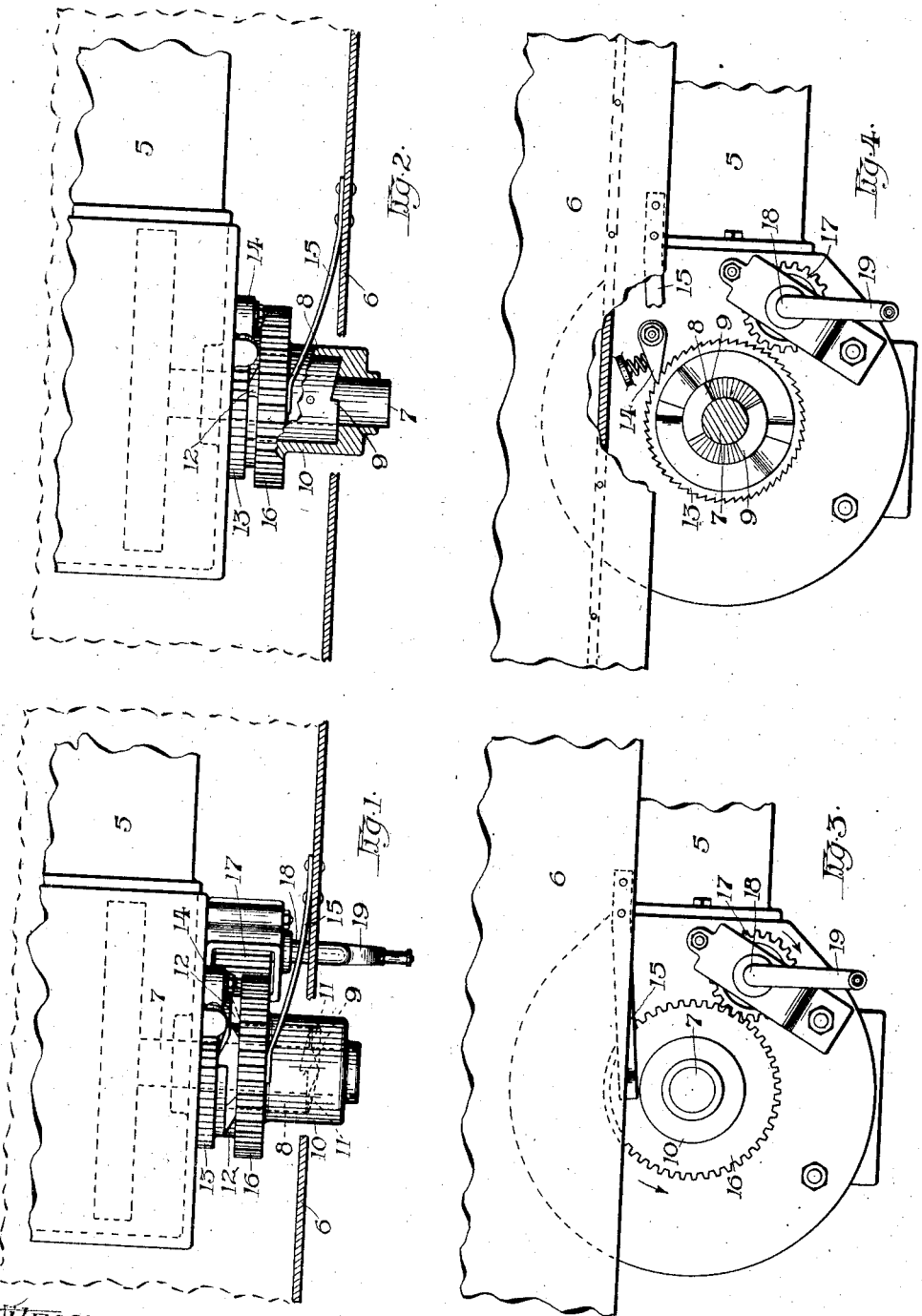
Witnesses:
F. W. Hoffmeister
W. M. Hafert
Inventor
Edward A. Johnston
By E. W. Burgess
Attorney

UNITED STATES PATENT OFFICE.

EDWARD A. JOHNSTON, OF AKRON, OHIO, ASSIGNOR TO INTERNATIONAL HARVESTER COMPANY, A CORPORATION OF NEW JERSEY.

STARTING MECHANISM FOR EXPLOSIVE-ENGINES.

No. 906,030.  Specification of Letters Patent.  Patented Dec. 8, 1908.

Application filed June 6, 1908. Serial No. 437,061.

*To all whom it may concern:*

Be it known that I, EDWARD A. JOHNSTON, a citizen of the United States, residing at Akron, in the county of Summit and State of Ohio, have invented certain new and useful Improvements in Starting Mechanism for Explosive-Engines, of which the following is a specification.

This invention relates to starting mechanism for explosive engines, and in particular to that type of mechanism which is designed to automatically uncouple the starting crank from the engine or motor shaft in case a reverse impulse is imparted to the shaft by a premature explosion during the operation of "cranking," the invention being especially applicable for use in connection with explosive engines of automobiles, motor boats and the like.

The invention has for its object a simple and efficient mechanism for automatically releasing the crank from the engine shaft, and in case of "back firing" this result is attained by the mechanism illustrated in the accompanying drawing, in which Figure 1 is a top plan view, partly in section, of so much of an engine and its supporting frame as is sufficient to illustrate my invention. Fig. 2 represents a part of Fig. 1, having some of its parts broken away for the purpose of further illustrating the mechanism. Fig. 3 is an end view of Fig. 1; and Fig. 4 is an end view, partly in section, of a part of Fig. 1.

The same reference numerals designate like parts throughout the several views.

5 represents a part of an engine which may be one of any of the common forms; 6 represents a part of a body frame of an automobile, or other fixed frame in which the engine is mounted; 7 represents an engine shaft; 8 is a sleeve secured to the shaft and provided with clutch teeth 9 at its outer end; 10 is a clutch member rotatably and slidably mounted upon the sleeve 8, having complemental clutch teeth 11 adapted to engage with the clutch teeth on sleeve 8. It is also provided with clutch teeth 12 upon its inner face that are adapted to engage the complemental clutch teeth forming a part of the ratchet toothed disk 13 that is also rotatably mounted upon the sleeve 8, the ratchet wheel being free to rotate upon the sleeve in one direction, but secured against rotation in an opposite direction by means of a spring pressed pawl 14 that is pivoted upon a fixed part of the engine frame and adapted to engage with the ratchet wheel.

15 represents a plate spring having one end secured to the frame member 6 and its opposite end engaging with the clutch member 10 in a manner to yieldingly hold it in engagement with the clutch portion of the sleeve 8.

16 represents a spur gear integral with the sleeve 8, which gear is adapted to mesh with a pinion 17 mounted upon a shaft 18 that is journaled in suitable bearings secured to the fixed frame and having a crank 19 at its outer end.

It is obvious that the sleeve 8 may be omitted and clutch teeth be formed directly upon the end of the engine shaft 7; but for convenience in manufacture it is preferred that the construction as illustrated be used.

In the operation of the device in starting the engine, the crank is turned in a direction to rotate the clutch member 10 in the direction indicated by the arrow in Fig. 3, and the spring 15, moving the clutch member 10 longitudinally along the shaft, will cause its teeth to engage with those formed upon the sleeve 8 and thereby rotate the sleeve and shaft in the proper direction. Should "back firing" occur, and the engine shaft and connected parts be caused to rotate in an opposite direction, the pawl 14 would prevent a rotative movement of the ratchet wheel, and the clutch teeth thereon, in riding over the complemental teeth formed upon the part 10, would cause the latter to move longitudinally along the shaft and disengage it from the clutch teeth on the sleeve 8, as shown by dotted lines in Fig. 1. After the engine has been started, and to prevent any rattling of the parts, the operator will turn the crank 19 in an opposite direction sufficient to cause the clutch members upon the sleeve 8 and ratchet disk 13 to move the part 10 entirely out of contact with the clutch portion of the sleeve 8.

What I claim as my invention, and desire to secure by Letters Patent, is:

1. A starting mechanism for explosive engines including, in combination, an engine shaft, a clutch sleeve secured thereto, a clutch member rotatably and longitudinally movable on said sleeve and adapted to be clutched therewith in a manner to rotate said sleeve and shaft in a direction to start the engine, a clutch disk loosely mounted upon said sleeve and adapted to engage with said clutch member and rotate therewith when the latter is operated to start the engine, said clutch disk being secured against rotation in an opposite direction and operative when so secured to disengage said clutch member from said sleeve, and means for yieldingly holding said clutch member in engagement with said clutch sleeve.

2. A starting mechanism for explosive engines including, in combination, an engine shaft, a clutch sleeve secured thereto, a clutch member rotatably and longitudinally movable on said sleeve and adapted to be clutched therewith in a manner to rotate said sleeve and shaft in a direction to start the engine, a clutch disk loosely mounted upon said sleeve and adapted to engage with said clutch member and rotate therewith when the latter is operated to start the engine, said clutch disk being secured against rotation in an opposite direction and operative when so secured to disengage said clutch member from said sleeve, and means for rotating said clutch member in a direction to start the engine, said means including a spur gear integral with said clutch member, a spur pinion meshing with said gear, said pinion being secured to a crank shaft mounted in fixed bearings on the engine frame.

3. A starting mechanism for explosive engines including, in combination, an engine shaft, a clutch member rotatably and longitudinally movable on said shaft and adapted to be clutched therewith in a manner to rotate said shaft in a direction to start the engine, a spring operative to cause said clutch member to move longitudinally upon said shaft in a manner to be clutched therewith, a ratchet toothed disk loosely mounted upon said shaft adjacent said clutch member, complemental clutch teeth upon the adjacent surfaces of said disk and clutch members, said teeth being adapted to interlock and cause said members to rotate in unison when said clutch member is rotated in one direction, and to separate said members when the clutch member is rotated in an opposite direction and the disk held against rotation, and means for holding said disk against rotation in an opposite direction.

EDWARD A. JOHNSTON.

Witnesses:
S. P. WALLACE,
W. L. CARLTON.